United States Patent [19]
Ito et al.

[11] Patent Number: 5,859,948
[45] Date of Patent: Jan. 12, 1999

[54] IMAGES PROCESSING APPARATUS FOR CONTROLLING BINARIZED MULTI-VALUE IMAGE DATA TO CONVERT PULSE WIDTHS DIFFERENTLY IN AT LEAST TWO MODES

[75] Inventors: Michio Ito, Hachioji; Masaharu Ohkubo, Yokohama; Hiroshi Sasame, Yokohama; Hiromichi Yamada, Yokohama; Masaki Ojima, Yokohama; Kaoru Seto, Chigasaki; Hiroshi Mano, Tokyo; Atsushi Kashihara, Hachioji; Takashi Kawana, Yokohama, all of Japan

[73] Assignee: Canon Kabushiki Kaisha, Tokyo, Japan

[21] Appl. No.: 378,875

[22] Filed: Jan. 24, 1995

Related U.S. Application Data

[63] Continuation of Ser. No. 266,612, Jun. 28, 1994, abandoned, which is a continuation of Ser. No. 991,280, Dec. 16, 1992, abandoned, which is a division of Ser. No. 444,306, Dec. 1, 1989, abandoned.

[30]    Foreign Application Priority Data

Dec. 6, 1988   [JP]   Japan ................................. 63-306985

[51] Int. Cl.$^6$ ............................. H04N 5/84; H04N 1/21; G01D 15/10
[52] U.S. Cl. ......................... 386/46; 386/127; 358/296; 358/462; 346/76.1; 346/107.1
[58] Field of Search .................................... 358/350, 351, 358/352, 345, 347, 346, 335, 77, 78, 296, 435, 436, 455, 462, 456; 346/108, 160, 762; 386/42–43, 127–130; H04N 5/76, 5/92, 5/84, 5/82, 1/46, 3/36, 3/40, 1/21, 1/23, 5/253

[56]    References Cited

U.S. PATENT DOCUMENTS

| | | |
|---|---|---|
| 4,096,530 | 6/1978 | Plugge et al. . |
| 4,447,832 | 5/1984 | Kurata et al. ............................ 358/465 |
| 4,449,152 | 5/1984 | Kurata et al. ............................ 358/296 |
| 4,553,173 | 11/1985 | Kawamura ............................... 358/465 |
| 4,616,319 | 10/1986 | Peters et al. ............................ 364/414 |
| 4,644,355 | 2/1987 | Constable . |
| 4,651,222 | 3/1987 | Gokita . |
| 4,679,053 | 7/1987 | Katsurai et al. ......................... 346/1.1 |
| 4,681,424 | 7/1987 | Kantor et al. . |
| 4,688,104 | 8/1987 | Wolcott . |
| 4,709,250 | 11/1987 | Takeuchi ................................. 346/160 |
| 4,730,214 | 3/1988 | Lambert . |
| 4,731,862 | 3/1988 | Tsuda et al. ............................. 358/465 |
| 4,737,860 | 4/1988 | Ono et al. ............................... 358/298 |
| 4,754,334 | 6/1988 | Lambert . |
| 4,788,674 | 11/1988 | Maeda et al. ............................. 369/54 |
| 4,821,115 | 4/1989 | Matsuchima et al. . |
| 4,888,618 | 12/1989 | Ishikawa . |
| 4,894,732 | 1/1990 | Ueda ....................................... 358/342 |
| 4,951,159 | 8/1990 | Van Beck . |
| 4,979,162 | 12/1990 | Kimoto et al. .......................... 369/116 |
| 4,994,356 | 2/1991 | Constable . |
| 5,016,112 | 5/1991 | Nakajima et al. ....................... 358/906 |
| 5,018,024 | 5/1991 | Tanioka ................................... 358/462 |
| 5,175,635 | 12/1992 | Yamada et al. .......................... 358/462 |
| 5,177,795 | 1/1993 | Tanioka et al. .......................... 358/462 |

*Primary Examiner*—Tha Tran
*Attorney, Agent, or Firm*—Fitzpatrick, Cella, Harper & Scinto

[57]    ABSTRACT

An image recording apparatus for recording image data from an external apparatus receives the image data as an image signal from the external apparatus, records the received image signal, and outputs a characteristic signal regarding a recording characteristic of the recording apparatus to the external apparatus.

12 Claims, 8 Drawing Sheets

| 4 | 16 | 14 | 2 |
|---|----|----|---|
| 11 | 5 | 7 | 9 |
| 13 | 1 | 3 | 15 |
| 8 | 10 | 12 | 6 |

IMAGES PROCESSING APPARATUS FOR CONTROLLING BINARIZED MULTI-VALUE IMAGE DATA TO CONVERT PULSE WIDTHS DIFFERENTLY IN AT LEAST TWO MODES

This application is a continuation of application Ser. No. 08/266,612 filed Jun. 28, 1994, now abandoned, which is a continuation of application Ser. No. 07/991,280 filed on Dec. 16, 1992, now abandoned, which is a divisional application of application Ser. No. 07/444,306 filed on Dec. 1, 1989 now abandoned.

BACKGROUND OF THE INVENTION

1. Field of the Invention

This invention relates to an image recording apparatus which records image or character data on a recording medium, such as paper or the like, and especially relates to a recording apparatus which receives image data in the form of an electric image signal from an external apparatus, e.g., a host computer, an image reader, a controller or the like, and outputs high quality visible images.

2. Background

In one type of conventional image recording apparatus (for convenience, generically called a "printer" in this specification), e.g., a laser beam printer which applies electrostatic photography, or the like, generally a host computer (as an example of what is herein termed "external apparatus") executes image. processing, e.g., a screen process or a dither process and binarizes image data prior to supplying the data to the printer, to obtain halftone images. In another conventional laser beam printer, disclosed in U.S. Pat. No. 4,800,442, a turning-on period of a laser, is controlled by controlling the width of a pulse, in the main scanning direction, representing the image. To express halftone images, the turning-on period of the laser is shortened compared to the turning-on period which would correspond to one image dot (i.e., pure black).

Thus, it is convenient for the host computer to carry out the various kinds of image processes, from the viewpoint of data storing ability and the like. Further, the host computer can send a binary signal to a printer, to lessen the amount of data to be sent, and it is effective for such sending of data.

However, the above-mentioned conventional printers generally have different halftone characteristics from each other depending on types and devices of printers, so that those printers output images having different densities in a given portion even if the same image data is supplied to these printers. For example, the external apparatus supplies a 4×4 dither pattern (an example is shown in FIG. 2) to printers, one of which has an input/output characteristic A (shown as a solid line in FIG. 3), and another of which has another input/output characteristic B (shown as a broken line in FIG. 3). As a result, even if the same image signal, processed with the same dither pattern, is supplied, it can occur that one printer may be unable to express a bright area because a small point is not recorded, while another printer cannot express a dark area because a small white point is covered by other, black marks.

Strictly speaking, not only a halftone image like a photograph but a character image also has the same problem as discussed above. Especially a character image which has small characters expressed with thin lines has this problem because the thin lines are output with lines of different widths by different printers.

Thus, when an image processing system is structured with one host computer and several kinds of printers, there are problems such as an output image on a recording medium, e.g., a paper, being totally blurred and having thin-lined characters, or another output image being totally dark and has crushed characters.

SUMMARY OF THE INVENTION

A purpose of the present invention is to provide an image recording apparatus which overcomes the above mentioned shortcomings.

Another purpose of the present invention is to provide an image recording apparatus which can always obtain high quality visible images in accordance with the characteristics of the used to produce the images, even when the system incorporating the apparatus is structured with a common external apparatus and a plurality of kinds of printers having different recording characteristics from each other.

In order to achieve these purposes, an image recording apparatus of the present invention, which receives image data input as an electrical signal from an external apparatus and outputs visible images, includes means for outputting a characteristic signal regarding an image recording characteristic of the recording apparatus, to the external apparatus.

According to another aspect of the present invention is provided an external or output apparatus for an image recording apparatus, wherein the external apparatus deals with a recording characteristic signal from the recording apparatus as a gradation correction signal for halftone images.

According to another aspect of the present invention is provided an image processing system which includes an image recording apparatus having means for outputting a characteristic signal regarding an image recording characteristic of the recording apparatus, and an external apparatus which deals with the characteristic signal output from the recording apparatus as a gradation correction signal for image data.

Thus, in an apparatus constructed in accordance with these aspects of the invention, information about recording characteristics which are different for respective printers is output to an external apparatus, e.g., a host computer, a controller, or the like, as a recording characteristic signal, and the external apparatus makes a suitable correction, corresponding to the respective recording characteristics to image data for each of the printers in response to the respective recording characteristic signals, and supplies suitably corrected image signals to the recording apparatus.

As a result, the external apparatus is able to maintain output images in constant high quality regardless of the differences among the various kinds of printers.

The foregoing summary of certain advanced features of the invention is provided in order that the detailed description of the embodiments thereof that follows may be better understood, and in order that the present contribution to the art may be better appreciated. There are, of course, additional features of the invention that will be described in that detailed description with reference to the accompanying drawings. Those skilled in the art will appreciate that the conception upon which this disclosure is based may readily be utilized as a basis for designing other structures or methods for carrying out the purposes of the invention. It will be understood what the claims are to be regarded as including such other constructions and methods as do not depart from the spirit and scope of the invention.

DETAILED DESCRIPTION OF THE PREFERRED EMBODIMENTS

First Embodiment

Figure 1:
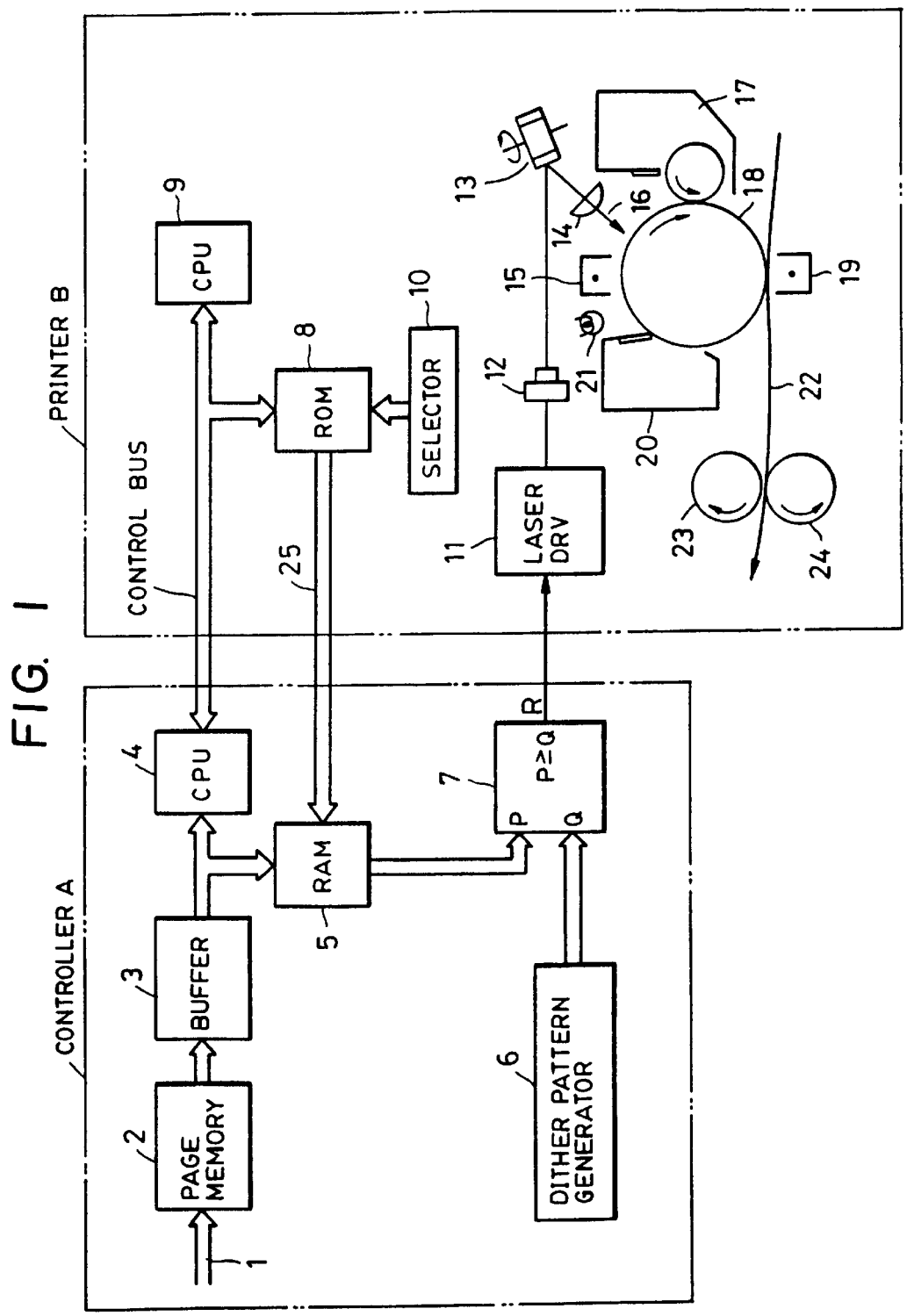
FIG. 1 is a block diagram illustrating a structure of one preferred embodiment of the present invention.
Figures 2, 3:
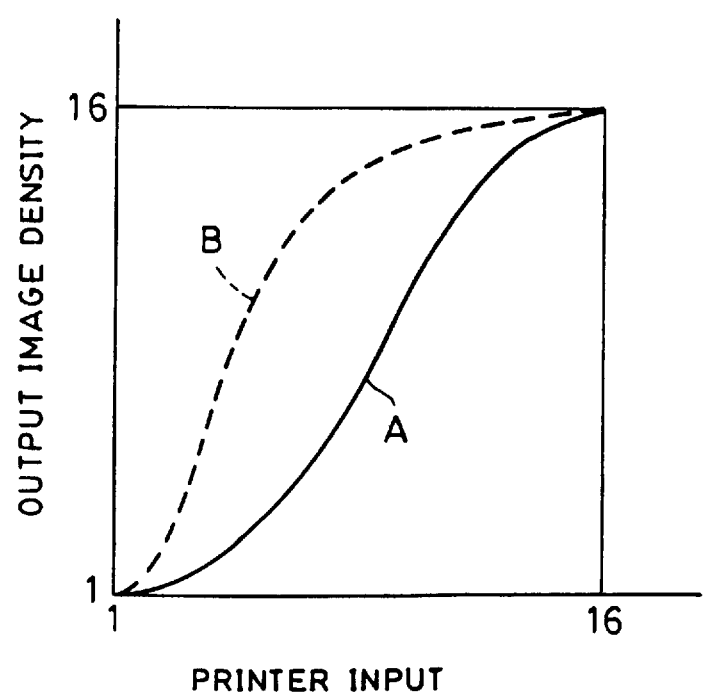
FIG. 2 is a drawing showing an example of a dither matrix.
FIG. 3 is a drawing showing gradation characters of printers.

FIG. 1 shows a structure having a printer B and a controller A as an external apparatus. FIG. 3 shows gradation characteristics of a printer using a dither matrix shown in FIG. 2. In FIG. 3, solid line A shows a gradation characteristic when the printer is in a normal atmosphere, and broken line B shows a gradation characteristic when the printer is in an atmosphere at high temperature and high humidity.

In FIG. 1, controller A and printer B have their own housings separately. Signal communications between circuits of controller A and printer B are controlled by a CPU (Central Processing Unit) 4 of the controller A and a CPU 9 of the printer B. Input image data 1 is input to the controller A as an external apparatus from an image reader (not shown), a magnetic disc device (not shown) or the like, and is then stored in a page memory 2. In this embodiment, it is assumed that each picture element of the image data 1 has four bits. The image data arranged as a 4-bit multi-valued signal in the memory 2 is read out to a line buffer 3 sequentially when printer B starts printing. After the image data is synchronized with a video signal R, the image data is corrected, while remaining in digital form, by a look-up table in a RAM (Random Access Memory) 5. This correction is a density gradation correction in response to a recording characteristic of the connected printer B.

Figure 4:
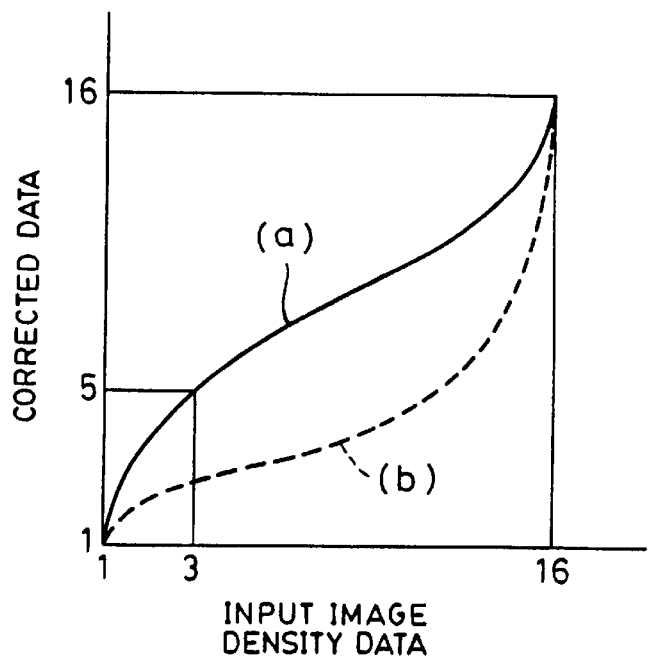
FIG. 4 is a graph illustrating contents of a looking-up table for gradation correction in the embodiment of FIG. 1.

On the other hand, a ROM (Read Only Memory) 8 of the printer B stores a plurality of look-up tables which, like the look-up table in RAM 5, are addressed by using as an address signal the input image density data, and whose output data is gradation-corrected data as illustrated by lines (a) and (b) in FIG. 4. One of the plurality of look-up tables is selected by a selector 10, and the contents of selected look-up table are transferred to the RAM 5 as a printer characteristic signal 25. The RAM 25 renews its contents on the basis of signal 25. The timing for loading the signal 25 to the RAM 5 is preferably immediately after power is applied to both the controller A and the printer B, and when the selector 10 selects a new look-up table.

The reason why the ROM 8 stores the plurality of look-up tables is to compensate for variations of recording characteristics depending upon the atmosphere around the printer B, or upon how long the printer B has been used. Further, if the signal structure of the input image data is varied by changing a kind of an image reader or etc., the plurality of look-up tables can easily apply to the new signal structure. The data of the lines (a) and (b) of FIG. 4 are assumed to correspond to printer characteristic signals for compensating for the density characteristics of the printer B as shown by lines A and B of FIG. 3.

The selection of the look-up table corresponding to the line (a) of FIG. 4 from among the plurality of tables by the selector is explained as follows.

Figure 5:
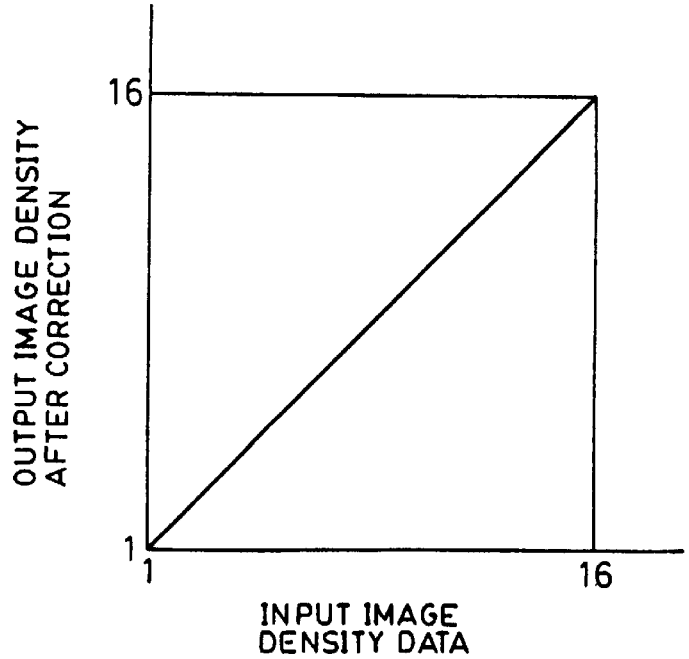
FIG. 5 is a graph showing an input/output characteristic after gradation correction.

The printer characteristic signal 25 corresponding to the line (a) of FIG. 4 is transferred from the ROM 8 to the RAM 5, and the entire contents of the RAM 5 are rewritten with the converting data of the line (a) of FIG. 4. Therefore, if "3" as input image density data, for example, is input as an address to the RAM 5, the RAM 5 outputs "5" as converted data to a data bus of the RAM 5. As a result, the non-linear input/output image gradation characteristic of the printer B as shown in FIG. 3 is converted to an almost linear input/output image gradation characteristic as shown in FIG. 5.

Further, the image data converted by the RAM 5 is transferred to a terminal P of a comparator 7 in synchronism with a standard clock. On the other hand, the other terminal Q of the comparator 7 receives as input the data of the dither matrix, as shown in FIG. 2, from a dither matrix generator 6, also in synchronism with the standard clock. Calling that data input to the terminal P, "P", and that input to the terminal Q, "Q", the output value R from the comparator is "1" when P≧Q and "0" when P<Q. The value R is output to the printer B.

The output value R from the comparator 7 is input to a laser driver 11 of the printer B, and the laser driver 11 drives a laser diode 12 in ON or OFF condition in response to the output value R being "1" or "0", respectively.

The laser beam discharged from the laser diode 12 is converted to a scanning beam by a rotating polygonal mirror 13, and the scanning beam scans a photosensitive drum 18 via a lens system 14. A beam detector (not shown) detects part of the scanning beam, and generates a signal which is used for a synchronizing signal of the output value R and the dither pattern generator 6. The photosensitive drum 18 is charged to a constant value by the charger 15, and a potential image is formed on a surface of the drum 18 by the above-mentioned scanning beam. The potential image is developed by a developer 17. The developed pattern on the drum 18 is transferred to a transferring medium 22, e.g., a recording paper, by a transferring charger 19, and is fixed on the transferring medium 22 by a pair of thermo-fixing rollers 23 and 24. The rest of the developer which is left on the drum without being transferred is collected by a cleaner 20. Further, a pre-exposure lamp 21 erases the rest of electric charge on the surface of the drum 18, and the above-mentioned process for image formation is repeated.

The selection of the look-up table can be carried out manually, but it is preferable that it be carried out automatically by detecting the ambient atmosphere with sensors, and/or by counting and storing how many papers the printer has printed, with a counter. Further, the page memory 2 in the controller A is not always necessary, and image data can be input to the controller A sequentially without the page memory 2.

Second Embodiment

The rising-up speed of laser beam output in a laser beam printer varies greatly, especially because semiconductor lasers, commonly used in such printers, have different radiation characteristics and laser drivers have different rising-up speeds of those current in addition to various radiation characteristics. This variation of the rising-up speed greatly influences the quality of images output from laser printers.

One example of the influence on quality of output images is explained as follows referring to FIGS. 6, 7(A) and 7(B).

Figure 6:
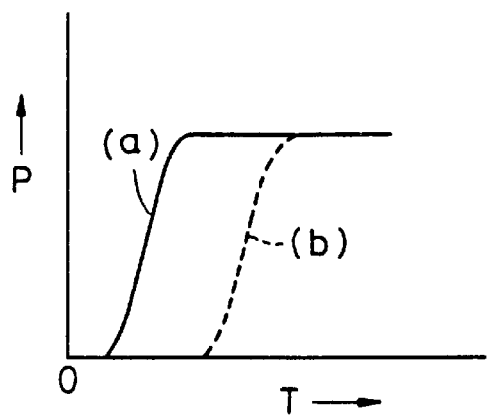
FIG. 6 is a graph showing a rising-up characteristic of the laser light output of a laser optical system.

FIG. 6 shows rising-up characteristics of laser beam output, horizontal axis is a time T axis, and the vertical axis is an axis of laser beam output intensity P. In FIG. 6, T=O is a timing when a laser turning-on signal is applied to a laser driver. Solid line (a) in FIG. 6 shows a fast rising-up characteristic of laser beam output, and broken line (b) shows a slow rising-up characteristic. Normally, the time lag between the lines (a) and (b) is several tens of nanoseconds depending on various characteristics of both the laser generators and the laser drivers.

Figure 7:
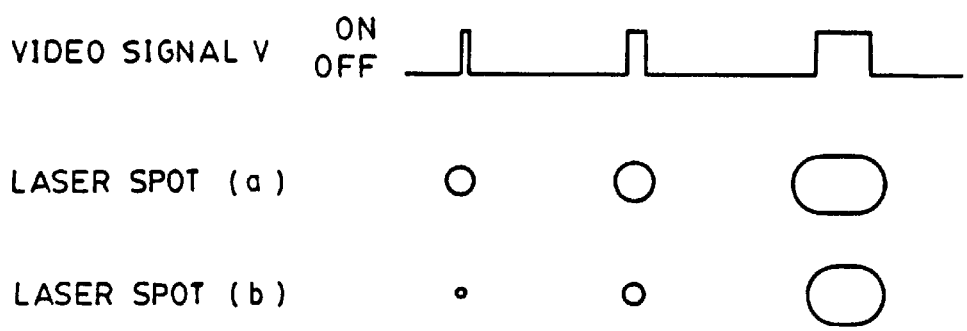
FIGS. 7(A) and 7(B) are diagrams illustrating the effect of the rising-up characteristic of laser light output on output images.
Figure 7:
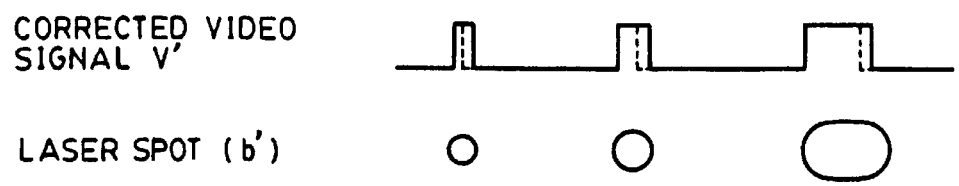

FIG. 7(A) shows an input video signal V for driving a laser driver and laser spots (a) and (b) which are created on the surface of the drum 18 by lasers having characteristics (a) and (b) in FIG. 6, respectively, when the input signal is applied to the lasers.

In the case when a laser printer having the slow rising-up character as shown by the line (b) in FIG. 6 is used with a short laser-on signal, the laser spot becomes extremely small as shown by laser spot (b), compare d to the other case having the fast characteristic as shown by laser spot (a). This phenomenon makes lines of small characters thin and makes graphic images having many one-dot signals light. Thus, this phenomenon results in a lessened quality of output images.

In this second embodiment, a laser optical system including the laser diode 12 and the laser driver 11 of the printer B is classified in several ranks based on the rising-up speed of laser beam output, and the printer B sends the printer characteristics signal 25' showing the classified rank to the controller A. By means of this, the above-mentioned shortcoming is eliminated. The rising-up characteristic of the laser optical system used in the printer B is measured, and a classified rank, based on the measured value, is displayed on the laser optical system by means of a label. An operator or a service person of the printer B manually sets a selection switch installed in the printer B in response to the displayed rank. Thereby, if the laser optical system is later replaced, it is easy to adopt a new laser optical system for the printer.

Figure 8A:
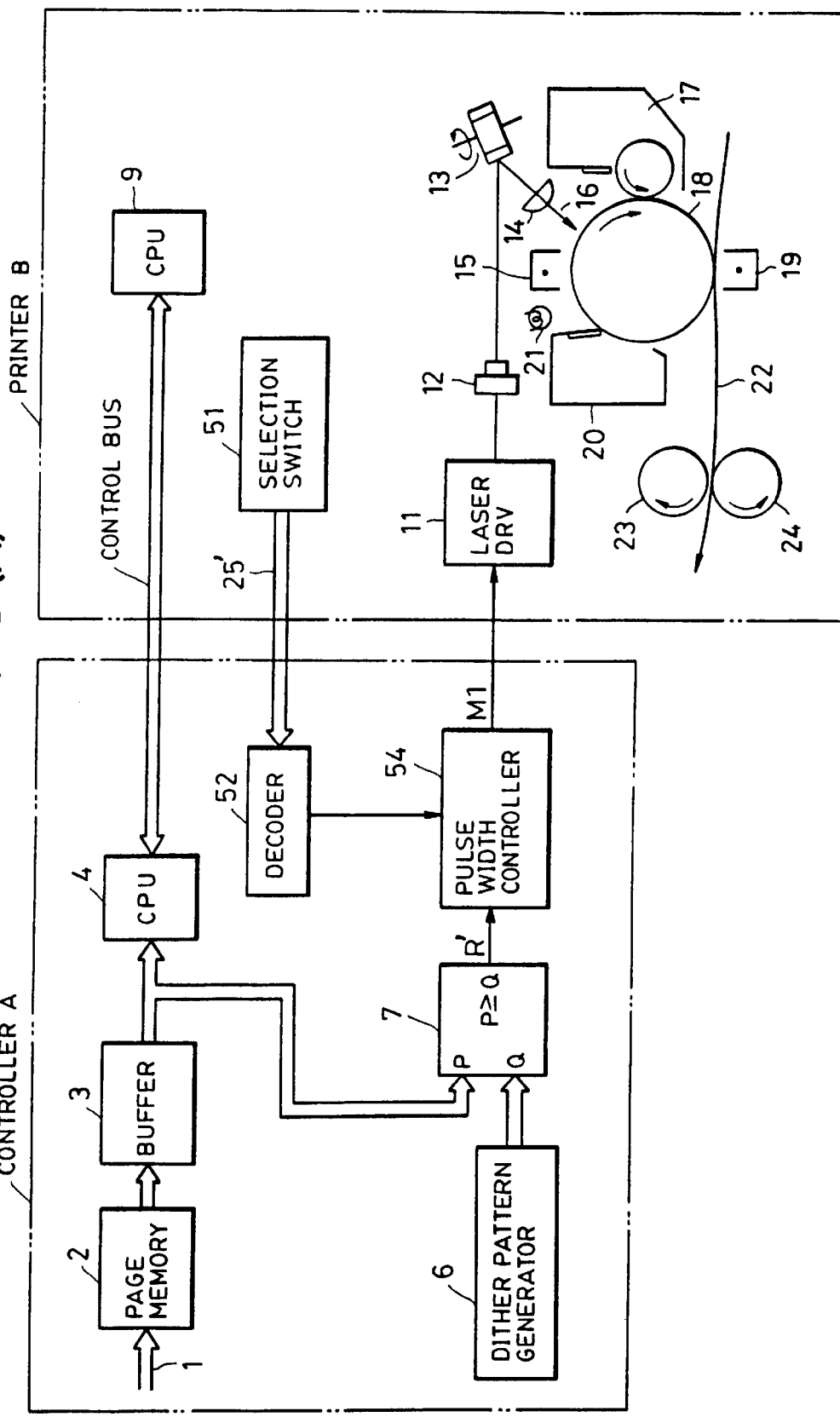
FIG. 8(A) is a block diagram illustrating a structure of a second preferred embodiment of the present invention.
Figure 8:
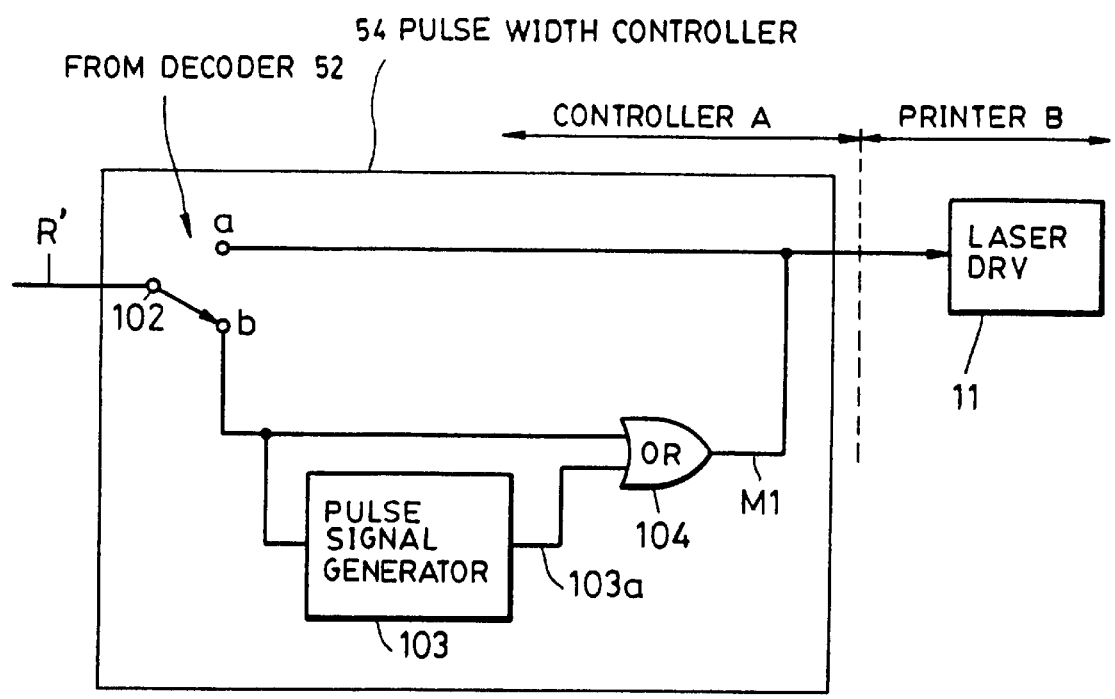
FIG. 8(B) is a block diagram showing a structure of an image signal correction circuit in the second embodiment.

The structure of the second embodiment is shown in FIG. 8(A). In FIG. 8(A), elements which have same functions as in FIG. 1 have the same identification numbers. The printer B provides a selection switch 51 for selecting the classified ranks, and the controller A includes a decoder 52 for decoding the printer characteristic signal 25' showing the classified ranks and a pulse width controller 54 for controlling pulse width of video signal R'. The pulse width controller 54, which is shown in detail in FIG. 8(B), operates as follows.

Figure 9:
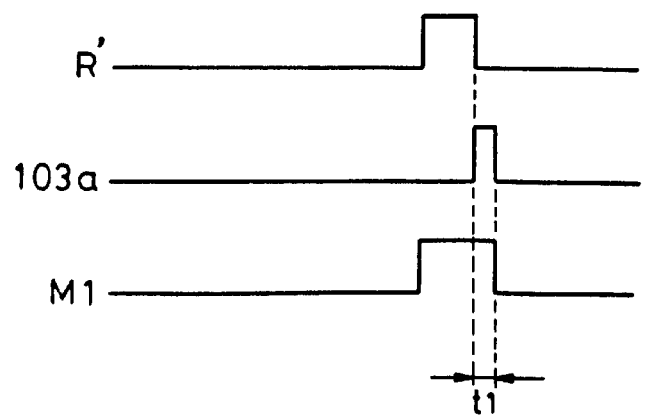
FIG. 9 is a timing chart showing output timings of various signals in FIG. 8.

The printer characteristic signal 25' showing the classified rank is transferred from the selection switch 51 of the printer B to the decoder 52 of the controller A. The decoder 52 outputs a signal to the pulse width controller 54 for selecting terminal (a) or (b) of a switch 102 based on the classified rank of the signal 25'. A pulse signal generator 103 is also provided for generating a pulse signal 103a having high-pulse period t1 in synchronism with a fall of the video signal R', made from input image data 1, for modulating the laser driver 11, as shown in FIG. 9. A logical OR gate 104 is provided for logically summing the video signal R' and the pulse signal 103a from the pulse signal generator 103, and for outputting a modified video signal M1 (FIG. 9) to the printer B for modulating the laser driver 11. The modified video signal M1 is used for printing in the printer B just as is the signal R in FIG. 1. FIG. 9 shows a timing chart of the signals R', 103a and M1.

Accordingly, the printer B can obtain a video signal V' (FIG. 7(B)) corresponding to the signal M1, longer than the video signal V (FIG. 7(A)) corresponding to the signal R'. Thereby, the substantial laser on-period of the slow laser optical system becomes equal to that of the fast laser optical system, and the size of the laser spot of the slow laser optical system also becomes substantially equal to that of the fast laser optical system, as shown in FIGS. 7(A) and (B).

In this embodiment a signal from the decoder 52 controls only the switch 102, but if the signal from the decoder 52 also controls pulse width of the pulse signal generated by the pulse signal generator, the pulse width controller 54 can control pulse width of the video signal R.

In this embodiment the selection switch 51 which generates the printer characteristic signal 25' showing the classified rank is manually set based on the rising-up speed of the laser beam output. However, the printer characteristic signal 25' showing the classified rank can be automatically sent to the printer A upon installing a laser optical system in the printer by installing sensors or switches which can automatically measure the classified rank of the laser optical system.

Third Embodiment

A third embodiment of the present invention is explained as follows referring to FIGS. 10 and 11.

Figure 10:
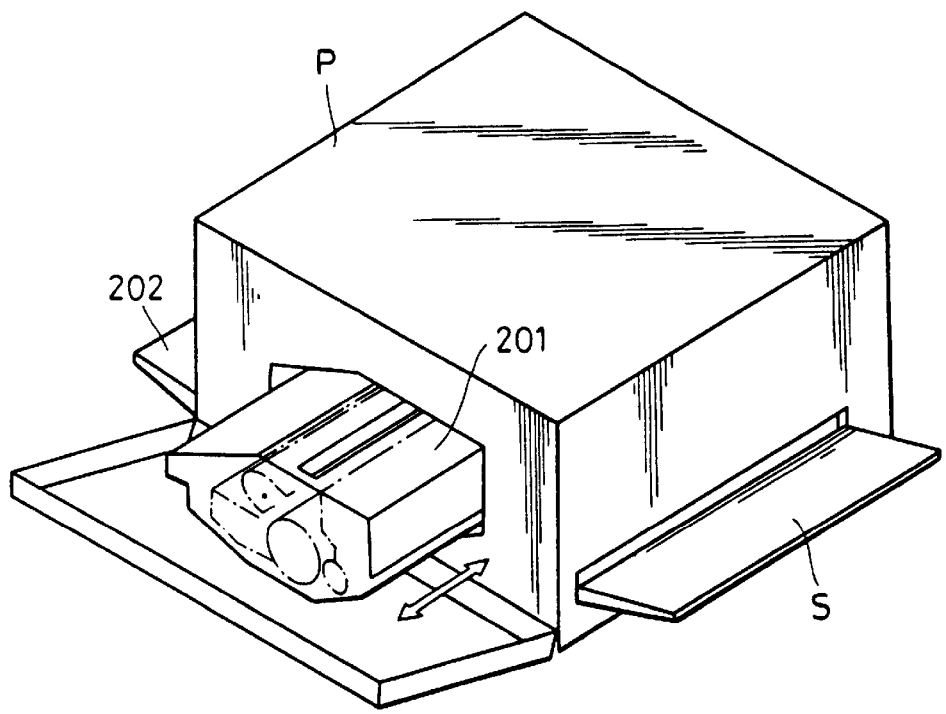
FIG. 10 is a perspective view showing the outside appearance of a printer having a process cartridge.
Figure 11:
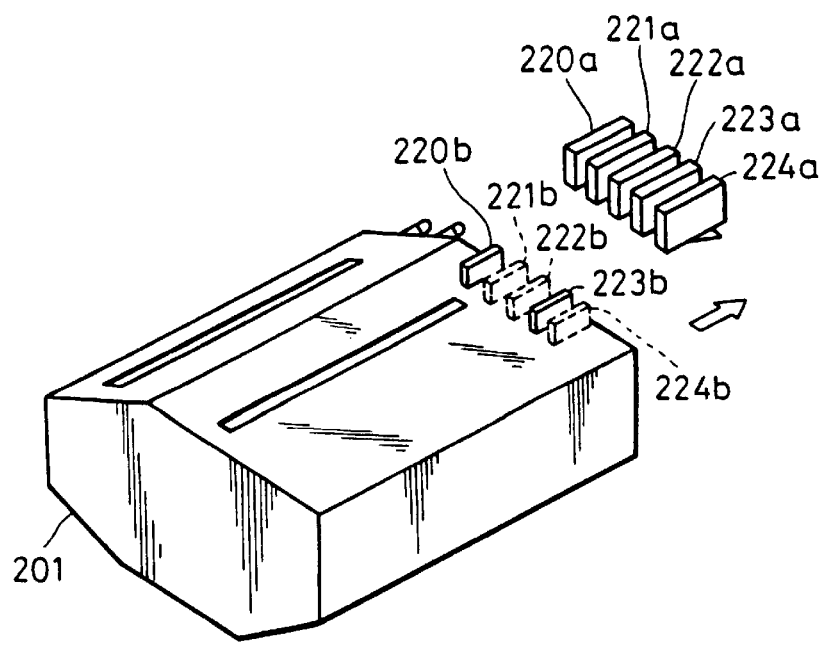
FIG. 11 is a perspective view showing the outside appearance of a process cartridge in a third preferred embodiment.

FIG. 10 shows an outside appearance of a printer having a process cartridge which includes various main parts needed for image formation, such as a photosensitive drum, a charger, a developer, a transferring changer and a cleaner, all of which is interchangeable as a unit. The printer shown in FIG. 10 is an electrostatic printer such as a laser beam printer, an LED (Light Emission Diode) printer, an LC (Liquid Crystal) printer or the like. FIG. 10 also shows the process cartridge 201 being removed from or attached to the printer housing P. The printer also has a paper deck S and a discharging tray 202.

The photosensitive drum in the process cartridge 201 has a sensitivity which varies for every production lot or every product depending on conditions and the atmosphere in which it was manufactured. In a laser printer, for example, if the sensitivity of the drum varies, the predetermined output of the laser beam cannot provide a desirable predetermined potential voltage on the drum, and as a result the line width of characters on the output images becomes thinner or thicker, or the density of output images becomes lighter or darker, upon every replacement of the process cartridge. Further, variability of the drum's sensitivity influences the density of halftone reproduction very greatly and reduces reproductivity of gradation, especially when halftone images are reproduced by a pulse width modulation method as disclosed in U.S. Pat. No. 4,800,442.

Therefore, in this embodiment, the process cartridge 201 is installed with one or a plurality of members 220b through 224b showing cartridge sensitivity. These members show the sensitivity of the photosensitive drum of the cartridge, and their installation positions and their number are decided based on a code of sensitivity levels.

When the process cartridge 201 is attached to the printer housing P, these members 220b~224b turn on corresponding microswitches 220a~224a installed in the printer housing P. Information as to the drum's sensitivity is transferred to the controller via an interface cable (not shown) as a production characteristic signal. The controller changes character fonts or changes width of characters based on the information as to the drum sensitivity. If the printer uses the pulse width modulation for reproducing halftone images, the controller makes a correction of pulse width to optimize the density of the halftone image. Then the controller outputs corrected image data to the laser driver 11 of the printer.

In the electrostatic printer, there is also some variability of characteristics in developing toner supplied to a developer depending on productive conditions or atmosphere, and this variability causes changes in density in output images.

Therefore, information about the variability of the toner might be provided to the controller by means of a printer characteristic signal showing a characteristic of the toner by using the same information input method as the members 220b~224b.

In this embodiment, an example of the process cartridge is explained. But, this invention can be applied to other printers without cartridges. For example, instead of using the members 220b~224b showing sensitivity, the information regarding an image forming characteristic of electrostatic printing can be transferred to the controller by manually operating switches provided for that purpose.

Fourth Embodiment

Figure 12:
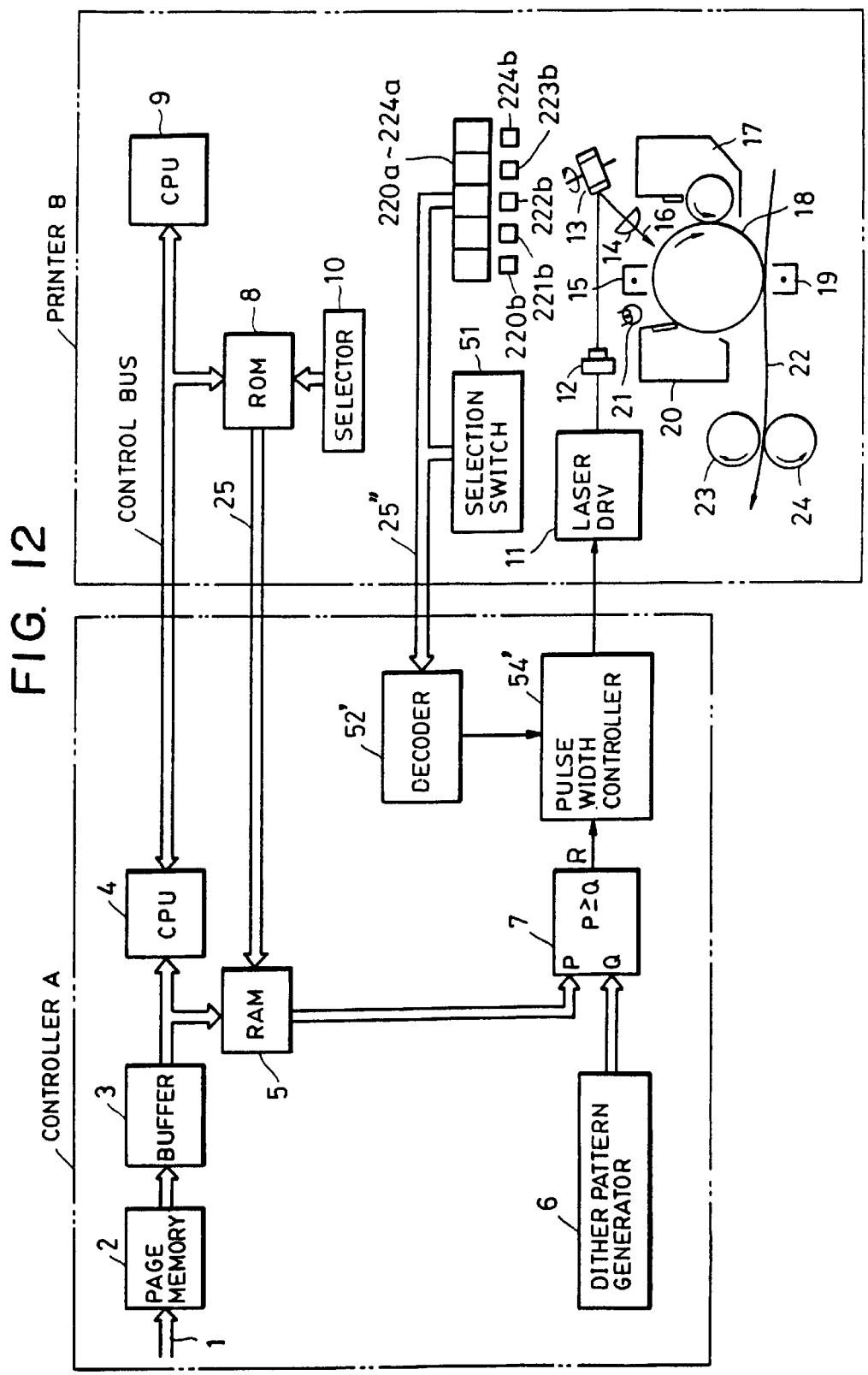
FIG. 12 is a block diagram showing a structure of a fourth preferred embodiment of the present invention.

FIG. 12 shows a block diagram showing a fourth embodiment which is a combination of the first through third embodiments.

In FIG. 12, elements which have same functions as in previously described embodiments have the same identification numbers, and explanations of these elements are omitted.

The ROM 8 sends the printer characteristic signal 25 having the contents of gradation conversion table fitting suitably to the printer B to the RAM 5. Further, a second printer characteristic signal 25" combining the rising-up characteristic of the laser optical system and the sensitivity characteristic signal of the drum 18 is sent to the decoder 52' from the selection switch 51 and the microswitches 220a~224a, and the decoder 52' analyzes the second printer characteristic signal 25" to output a control signal to the pulse width controller 54'. The pulse width controller 54' optimizes the pulse width of the video signal R in response to the control signal from the decoder 52'.

As stated, the fourth embodiment combines features of the first through third embodiments. But, a combination of the first and second embodiments and other combinations of the embodiments can be applied within the scope of the features described in connection with various of the disclosed preferred embodiments can be applied within the scope of the present invention.

Further, the present invention may be applied to other printers in which width of lines and image density depend on printers' characteristics.

Although particular embodiments of the present invention are herein disclosed for purposes of explanation, various modifications thereof, after study of this specification, will be apparent to those skilled in the art to which the invention pertains.

As described above, the present invention is structured such that a signal representing an image forming characteristic which is different for every printer is output from the printer to the external apparatus such as the host computer or the controller, and that the external apparatus makes an image processing correction suitable for the printer to the image data to be recorded, based on the image forming characteristic. Therefore, image quality which has heretofore been variable can be always kept high.

The external apparatus such as the host computer or the controller is structured originally for the purpose of signal processing, so that it is easy for the external apparatus to carry out complicated image processing. The external apparatus usually has a large memory capacity, so that this invention does not require much if any additional memory capacity for image processing. As a result, the entire system including the printer and the controller does not require additional cost, and the image quality of different printers can be kept constant.

Further, within the scope of the present invention, even though image data input to the printer is just binary data, the printer can obtain a high quality image by gradation correction of the image data based on the printer characteristic.

What is claimed is:

1. An image processing apparatus, comprising:
   means for inputting multi-valued image data, values of the multi-valued image data representing respective gradation levels;
   means for binarizing the multi-valued image data to generate a first binary image signal;
   receiving means for receiving, from a separate external recording apparatus, a characteristic signal representing a recording characteristic of the external recording apparatus;
   control means for controlling processing of the first binary image signal to output a second binary image signal in accordance with the characteristic signal received by said receiving means, each pulse width of the first binary image signal being converted to a respective pulse width of the second binary image signal; and
   transmitting means for transmitting the second binary image signal to the external recording apparatus.

2. An apparatus according to claim 1, wherein the external recording apparatus has a light-emitting element for emitting a beam in accordance with the second binary image signal, and wherein the characteristic signal is a signal corresponding to a rising-up characteristic of the beam emitted from the light-emitting element.

3. An apparatus according to claim 1, wherein said binarizing means comprises means for comparing the multi-valued image data input by said input means with a predetermined pattern signal.

4. An apparatus according to claim 3, wherein the predetermined pattern signal represents a dither pattern.

5. An apparatus according to claim 1, wherein the external recording apparatus has a light-emitting element for emitting a beam in accordance with the second binary image signal, and means for exposing a photosensitive member with the beam emitted by the light emitting element, and wherein the characteristic signal is a signal corresponding to a sensitivity of the photosensitive member.

6. An image recording apparatus comprising:

receiving means for receiving, from an external apparatus including means for binarizing multi-valued image data to generate a first binary image signal and means for converting the first binary image signal into a second binary image signal in accordance with a conversion characteristic such that each pulse width of the first binary image signal is converted to a respective pulse width of the second binary image signal, the second binary image signal;

recording means for recording the second binary image signal received by said receiving means; and transmitting means for transmitting a characteristic signal, representing a recording characteristic of said recording means, to the external apparatus, the characteristic signal being necessary to set the conversion characteristic of the converting means of the external apparatus.

7. An apparatus according to claim 6, wherein said recording means includes a light emitting element for emitting a beam in accordance with the second binary image signal, and wherein the characteristic signal is a signal corresponding to a rising-up characteristic of the beam emitted from said light-emitting element.

8. An apparatus according to claim 6, wherein said recording means includes a light-emitting element for emitting a beam in accordance with the second binary image signal, and means for exposing a photosensitive member with the beam emitted by said light emitting element, and wherein the characteristic signal is a signal corresponding to a sensitivity of said photosensitive member.

9. An apparatus according to claim 6, wherein the binarizing means comprises means for comparing the multi-valued image data with a predetermined pattern signal.

10. An apparatus according to claim 9, wherein the predetermined pattern signal represents a dither pattern.

11. An image processing method, comprising the steps of:

inputting multi-valued image data, values of the multi-valued image data representing respective gradation levels;

binarizing the multi-valued image data to generate a first binary image signal;

receiving, from a separate external recording apparatus, a characteristic signal representing a recording characteristic of the external recording apparatus;

controlling processing of the first binary image signal to output a second binary image signal in accordance with the characteristic signal received at said receiving step, each pulse width of the first binary image signal being converted to a respective pulse width of the second binary image signal; and transmitting the second binary image signal to the external recording apparatus.

12. An image recording method, comprising the steps of:

receiving, from an external apparatus including means for binarizing multi-valued image data to generate a first binary image signal and means for converting the first binary image signal into a second binary image signal in accordance with a conversion characteristic such that each pulse width of the first binary image signal is converted to a respective pulse width of the second binary image signal, the second binary image signal;

recording the second binary image signal received at said receiving step using a recording unit; and transmitting a characteristic signal, representing a recording characteristic of the recording unit, to the external apparatus, the characteristic signal being necessary to set the conversion characteristic of the converting means of the external apparatus.

* * * * *

UNITED STATES PATENT AND TRADEMARK OFFICE
CERTIFICATE OF CORRECTION

PATENT NO. : 5,859,948                              Page 1 of 2

DATED      : January 12, 1999

INVENTOR(S) : MICHIO ITO ET AL.

It is certified that error appears in the above-identified patent and that said Letters Patent is hereby corrected as shown below:

On the title page, item

[54] TITLE

"IMAGES" should read --IMAGE--.

COLUMN 1

Line 1, "IMAGES" should read --IMAGE--.

COLUMN 8

Line 65, "light emitting" should read
   --light-emitting--.

UNITED STATES PATENT AND TRADEMARK OFFICE
CERTIFICATE OF CORRECTION

PATENT NO. : 5,859,948

DATED : January 12, 1999

INVENTOR(S) : MICHIO ITO ET AL.

It is certified that error appears in the above-identified patent and that said Letters Patent is hereby corrected as shown below:

COLUMN 9

```
Line 19, "light emitting" should read --light-emitting--.
Line 28, "light emitting" should read --light-emitting--.
```

Signed and Sealed this

Fifteenth Day of February, 2000

Attest:

Q. TODD DICKINSON

*Attesting Officer*  *Commissioner of Patents and Trademarks*